United States Patent
Espeland et al.

[19]

[11] Patent Number: 6,048,593
[45] Date of Patent: Apr. 11, 2000

[54] POLYMER CONCRETE COMPOSITIONS, STRUCTURES MADE THEREFROM, AND METHODS OF MANUFACTURE

[75] Inventors: John D. Espeland, West Des Moines; Robert W. Espeland, Urbandale; Michael L. Olson, West Des Moines, all of Iowa

[73] Assignee: Espeland Composite Technology, Inc., Ankeney, Iowa

[21] Appl. No.: 08/744,847

[22] Filed: Nov. 8, 1996

[51] Int. Cl.[7] .................................................. C08L 63/00
[52] U.S. Cl. ...................... 428/34.1; 428/402; 428/404; 523/505; 523/218; 523/466; 523/220; 523/440; 523/513; 264/463
[58] Field of Search ................................. 428/34.1, 402, 428/404; 523/505, 218, 466, 220, 440, 513; 264/463

[56] References Cited

U.S. PATENT DOCUMENTS

| | | | |
|---|---|---|---|
| 4,371,639 | 2/1983 | Muszynski | 523/512 |
| 4,375,489 | 3/1983 | Muszynski | 428/36 |
| 4,621,010 | 11/1986 | Wadsworth | 428/220 |
| 4,730,012 | 3/1988 | Espeland et al. | 523/505 |
| 4,737,538 | 4/1988 | Halper et al. | 524/505 |
| 4,885,072 | 12/1989 | Harry et al. | 204/279 |
| 5,017,632 | 5/1991 | Bredow et al. | 523/400 |
| 5,037,520 | 8/1991 | Harry et al. | 204/279 |
| 5,066,379 | 11/1991 | Harry et al. | 204/279 |
| 5,079,050 | 1/1992 | Harry et al. | 428/34.5 |
| 5,384,355 | 1/1995 | Allen | 524/650 |
| 5,611,974 | 3/1997 | Welch et al. | 264/34 |
| 5,794,402 | 8/1998 | Dumlao et al. | 52/783.17 |

OTHER PUBLICATIONS

R.A. Cubeta, "The Users of Precast Polymer Concrete Shapes", *Corrosion*, 87 Paper No. 162, pp. 1–6 (Mar. 9–13, 1987).

L. Czarnecki, "The Status of Polymer Concrete", *Concerete International*, 7 pages (1985).

R. Krels, "The Scope and Application of Synthetic Resin Concrete", *Respecta America, Inc.*, 5 pages.

"Reichhold Chemical Polymer Concrete Typical Formulation", 1 page.

*Primary Examiner*—Charles Nold
*Attorney, Agent, or Firm*—Mueting, Raasch & Gebhardt, P.A.

[57] ABSTRACT

A polymer concrete composition preparable by combining components comprising: a resin blend comprising at least one unsaturated vinyl ester resin and at least one unsaturated polyester resin; at least about 10 weight percent, based on the total weight of the composition, of extremely filler material having an average particle size of less than about 500 microns; and at least about 20 weight percent, based on the total weight of the composition, of fine filler material having an average particle size of about 500–1000 microns.

30 Claims, 1 Drawing Sheet

POLYMER CONCRETE COMPOSITIONS, STRUCTURES MADE THEREFROM, AND METHODS OF MANUFACTURE

BACKGROUND OF THE INVENTION

This invention relates to polymer concrete compositions for use in making corrosion resistant structures and other structural composite elements, as well as methods of making same. Polymer concrete is a term that applies to a variety of composites of polymer and concrete. Such composites can be made by impregnating hardened portland cement with a liquid monomeric material that is subsequently polymerized in situ. Alternatively, they can be made by combining monomeric or polymeric material with a fresh portland cement concrete mixture, both of which are subsequently hardened. Other composites referred to as polymer concrete do not contain cement, per se; rather, they are composites made by polymerizing a monomeric or oligomeric material with filler material, such as aggregate (e.g., gravel, sand, etc.).

Polymer concrete composites have remarkable durability and can have remarkable resistance to salts, acids, and other corrosive materials depending on the formulation. They are, therefore, suitable for use in pipe, tunnel support linings, bridge decks, and corrosion resistant electrolytic containers, for example. The latter represent a significant market for use of polymer concrete composites.

Metals must typically be isolated from mined ores containing the metals. For example, copper must either go through an extraction process to remove copper in pure form, or through refining process in order to eliminate impurities contained in mined copper ores. Electrolytic refining is one of the methods used for refining copper and solvent extraction-electrowinning (SX-EW) is one of the methods used to extract pure copper. In the copper processing industry 85% of the processed copper is obtained by electrolytic refining and the other 15% is obtained by SX-EW. In both the electrolytic refining and the SX-EW processes, copper is extracted from a corrosive electrolytic solution contained in large processing tanks or cells.

The production cost of mineral processing of copper using electrolytic, electrowinning, and SX-EW processing are significantly lower than the cost of processing using mill concentrates, smelting, and refining. For example, production costs for SX-EW and/or electrowinning are significantly lower, averaging a savings of over 60%, than those for copper production via mill concentrates, smelting, and refining. Thus, the technology of solvent extraction-electrowinning (SX-EW) copper production has progressed rapidly over the past five years. It has gained increasing popularity, not only because it is more cost efficient, but also because it is more environmentally acceptable. Further, this technology requires less energy than conventional copper production methods.

The electrolyte solution used in these processes has an acid combination base which is highly corrosive to the material of the container. Various efforts have been made, with limited success, to provide a container which could withstand the highly corrosive environment of the electrolyte solution. Regular replacement and maintenance are needed with the existing containers creating high repair and high replacement cost, causing excessive downtime and lost production.

One way in which the base container has been protected from the corrosive solution is to use a corrosive protective liner, either of hard material or a flexible material, which is placed either over or in the existing container. The container is usually made of a steel-reinforced concrete; however, these concrete containers have been plagued with problems. For example, liners easily leak and vapor and/or mist from the electrolyte solution can penetrate the area between the liner and the concrete container. As a result, the concrete can erode and/or the steel reinforcement can corrode, thereby causing the containers to fail. Such failed containers can be expensive to dispose of because they tend to absorb the highly toxic electrolytic solutions.

Another effort to provide a container which can withstand the highly corrosive environment of the electrolyte solution is through the use of polymer concrete. Typical polymer concrete composites are made from one or more resins, a promoter, and a catalyst to cure the material, along with aggregate. They typically also include fillers such as silica, sand, flour silica, mica flakes, glass spheres, and fiberglass in various sizes. The composite container will sometimes have a gel coat, surface resin and/or a surface veil and mat system to create a corrosive resistant smooth surface.

Although conventional polymer concrete composite containers are a great improvement, they still have many disadvantages. Some of these disadvantages include the high cost of fabrication due to the material costs and manufacturing techniques currently used. Also, conventional polymer concrete composite containers typically require the use of steel reinforcement. Such containers are susceptible to draining electrical current and leaking. There can also be problems with: the formation of cold joints from the casting process causing leaking and leaching paths; irregular interior surfaces creating difficulty in cleaning the container; leaks and leaching sources due to the attachment of overflow and decant boxes, which are cast separately and then attached; the failure of gel coating on the container surface walls in the form of scratches and tears caused by mechanical abuse; poor distribution of solutions in the containers; poor drainage of the solutions from the containers caused by design flaws in the plumbing and mechanical failure of the plumbing; the lack of overall material and/or structural strength in the containers; the failure of hardware and/or plumbing in the container due to mechanical abuse; the difficulty of obtaining consistent specifications and tolerances of the container dimensions; and the consistent leaking and/or leaching of the electrolyte solution through plumbing joints and surface gel coat systems. Leakage can destroy tankhouse floors, short circuit the electrical current, leach into the ground water, disrupt production, and/or threaten the safety of the tankhouse crew. Thus, previous efforts in creating suitable corrosive resistant containers for the electrowinning and/or refining have not been satisfactory.

Therefore, there is a need for polymer concrete composites that can be used in corrosive environments.

SUMMARY OF THE INVENTION

The present invention provides a castable polymer concrete composition preparable by combining components comprising: a resin blend comprising at least one unsaturated vinyl ester resin and at least one unsaturated polyester resin; at least about 10 weight percent (preferably, about 10–40 weight percent), based on the total weight of the composition, of extremely fine filler material having an average particle size of less than about 500 microns; and at least about 20 weight percent (preferably, about 20–60 weight percent), based on the total weight of the composition, of fine filler material having an average particle size of about 500–1000 microns.

The resin blend preferably comprises thermoset and thermoplastic resins. A particularly preferred embodiment comprises at least one modified styrenated epoxy vinyl ester resin, at least one isophthalic or orthophthalic polyester resin, and at least one polyester-polyurethane resin. The extremely fine filler material preferably comprises baryte (barium sulfate).

Another embodiment of the present invention is a castable polymer concrete composition preparable by combining components comprising: a resin blend comprising at least one unsaturated vinyl ester resin and at least one unsaturated polyester resin; and at least about 10 weight percent, based on the total weight of the composition, of baryte.

Another embodiment of the present invention is a polymer concrete composite preparable by: combining components comprising a resin blend comprising at least one unsaturated vinyl ester resin and at least one unsaturated polyester resin; at least about 10 weight percent, based on the total weight of the composition, of extremely fine filler material having an average particle size of less than about 500 microns; and at least about 20 weight percent, based on the total weight of the composition, of fine filler material having an average particle size of about 500–1000 microns; and curing said combination of components.

Yet another embodiment of the present invention is a cast article preparable by: combining components comprising a resin blend comprising at least one unsaturated vinyl ester resin and at least one unsaturated polyester resin; at least about 10 weight percent, based on the total weight of the composition, of extremely filler material having an average particle size of less than about 500 microns; and at least about 20 weight percent, based on the total weight of the composition, of fine filler material having an average particle size of about 500–1000 microns; placing said combination of components in a mold; and curing said combination of components. Preferably, the cast article is a monolithic cast structure, such as an electrolytic container.

A further embodiment of the invention is a method of making a polymer concrete composite, the method comprising: preparing a resin blend comprising at least one unsaturated vinyl ester resin and at least one unsaturated polyester resin; adding to the resin blend at least about 10 weight percent, based on the total weight of the composition, of extremely fine filler material having an average particle size of less than about 500 microns, and at least about 20 weight percent, based on the total weight of the composition, of fine filler material having an average particle size of about 500–1000 microns; adding a catalyst to the mixture of extremely fine and fine filler materials and resin blend; adding to the mixture of extremely fine and fine filler materials and resin blend, at least about 15 weight percent, based on the total weight of the composition, of coarse filler having an average particle size of greater than about 1000 microns; and adding fibrous filler material to the mixture of extremely fine, fine, and coarse filler materials and resin blend.

DETAILED DESCRIPTION

Figure 1:
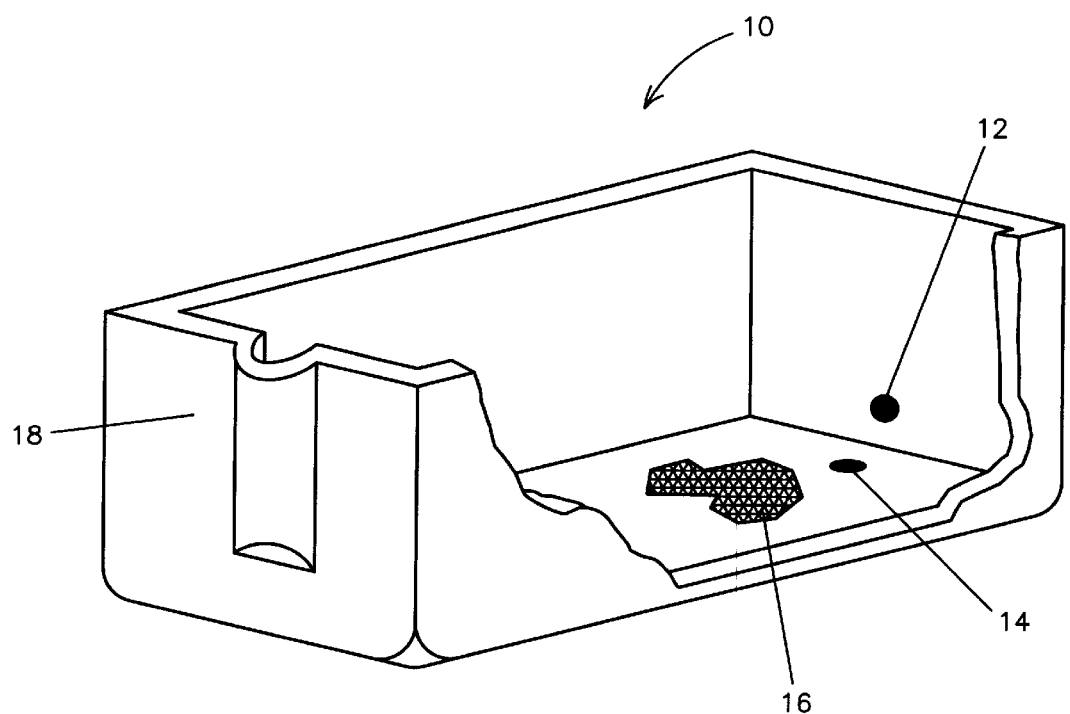
FIG. 1 is an electrolytic container made from a polymer concrete composite of the present invention.

This invention relates to polymer concrete compositions for use in making corrosion resistant structures and other structural composite elements, as well as methods of making same. The polymer concrete compositions of the present invention are particularly suitable for use in making articles such as pipes, pipe linings, tunnel support linings, bridge decks, building panels, armor plating, dam and spillway overflows, tank linings, electrolytic containers, cells, tanks, trenches, sumps, and monolithic cast structures (i.e., articles cast in one piece). The polymer concrete compositions are uniquely, although not exclusively, applicable to the field of electrolytic refining, electrowinning, and SX-EW mineral processing of metals in which a combination of corrosive metal-bearing acid solutions of hydrochloric, sulfuric, ferric sulfate, copper sulfate, and sulfuric acid solutions are employed.

The polymer concrete compositions of the present invention include a mixture of at least one type of resin, catalyst, and filler. Typically, the compositions include a mixture of filler materials to liquid materials in a weight ratio of at least about 4:1. Such compositions can be molded or cast into monolithic structures, for example.

Such compositions cure or harden to form polymer concrete composites that are advantageous compared to conventional polymer concrete composites, particularly with respect to the highly corrosive environmental conditions of the electrowinning and/or SX-EW form of refining. For example, the polymer concrete composites of the present invention can provide a container that will permit a constant operating temperature of about 65° C. and above, maintaining high current density. Also, preferred composites do not readily absorb liquids, particularly electrolyte solutions.

Advantageously, the polymer concrete compositions of the present invention can be cast into a single monolithic unit. This is significant for the manufacture of electrolytic containers without seams, which can reduce and/or eliminate leakage. Furthermore, this allows for the incorporation of the necessary hardware such as the plumbing drains, plugs, inlets, outlets, and overflow into the casting of the container, which can reduce and/or eliminate the possibility of leakage. Also, this allows for the elimination of 90° angles and/or sharp corners which are either inside and/or outside of the container structure. Such sharp 90° angles tend to crack and chip, creating an opening for the electrolytic solution to enter and erode the core of the container.

Furthermore, the polymer concrete compositions of the present invention provide cured or hardened composites that can be used in electrolytic containers without the need for a separate liner, gel coat, and/or veil/mat system to act as the primary corrosion barrier system for the container. This reduces and/or eliminates some of the problems that such components create such as, for example, the constant problem of tearing of the material, which then causes the container to erode from leakage, thereby short circuiting the electrical current, contaminating the solution with impurities, diminishing the effectiveness of the electrolytic process, and causing the refining process to take longer.

The polymer concrete composites of the present invention can be used to create articles, such as electrolytic containers, with far greater strength properties than conventional polymer concrete composites. Preferably, the polymer concrete composites of the present invention are at least about 6.5 times stronger than portland cement concretes in compression, at least about 5 times stronger in tensile, at least about 54 times stronger in shear, at least about 5.5 times stronger in bonding, and at least about 6 times stronger in flexure.

For example, the polymer concrete composites of the present invention exhibit about 13,000–17,000 psi compressive strength using ASTM C-39 and 15,000–20,000 psi using ASTM D-695. Standard portland cement concrete is only about 3,000 psi using ASTM D-695. The polymer concrete composites of the present invention exhibit about 1500–2000 psi tensile strength using ASTM D-638. Standard portland cement concrete is only about 370 psi using ASTM D-638. The polymer concrete composites of the present invention exhibit about 4000–6000 psi shear strength using ASTM D-732. Standard portland cement concrete is only about 110 psi using ASTM D-732. The polymer concrete composites of the present invention exhibit about 4000 psi flexure strength using ASTM C-947 and flexure (MOR) of 2740 psi using ASTM C-78. The bond strength is about 1200–2000 psi using ASTM C-882. Standard portland cement concrete is only about 370 psi using ASTM C-882. The bond strength of a polymer concrete composition to a polymer concrete composition of the present invention is about 9500 psi (compression load) using a ASTM C-882 and a control sample of a monolithic cast polymer concrete with a compressive strength of 10,700 psi (compression load) using ASTM C-39.

Significantly, these superior properties can be produced with reduced thickness and reduced weight when compared to standard portland cement concrete or conventional polymer concrete composites having a weight range of 70–150 pounds per cubic foot. Also, these superior properties can be produced without internal steel reinforcement to increase the structural strength, although steel reinforcement (e.g., rebar) can be used if desired. Typically and preferably, fiberglass reinforced plastic (FRP) rebar can be used in monolithic castings using the polymer concrete compositions of the present invention. Thus, nonconductive containers can be produced to eliminate the possibility of any short-circuiting and possible displacement of electrical current that runs through the electrolytic solution.

The polymer concrete compositions include a blend of at least two thermosetting resins and optionally one thermoplastic resin. The major component of the resin blend is an unsaturated vinyl ester resin, preferably a modified styrenated epoxy vinyl ester resin. Such unsaturated vinyl ester resins are disclosed, for example, in U.S. Pat. No. 4,375,489 (Muszynski). Vinyl ester resins are typically prepared by the esterification of polyepoxides with ethylenically unsaturated monocarboxylic acids in the presence of onium salts of inorganic acids. Typically, at least about 6 weight percent and no more than about 20 weight percent, based on the total weight of the composition, of the vinyl ester resin (or mixture of such resins) is used in the compositions of the present invention.

The minor component of the resin blend is an unsaturated polyester resin, which upon cure is preferably flexible. Unsaturated polyester resins are typically prepared by the reaction of an alpha,beta-ethylenically unsaturated dicarboxylic acid, or an admixture of such an acid with a saturated dicarboxylic acid, and a dihydric alcohol. Preferably, the unsaturated polyester resin is an isophthalic or orthophthalic polyester resin. More preferably, the unsaturated polyester resin is an isophthalic polyester resin. Such resins are used to reduce shrinkage of the polymer concrete compositions upon curing or hardening. Typically, at least about 0.5 weight percent and no more than about 3 weight percent, based on the total weight of the composition, of the unsaturated polyester resin (or mixture of such resins) is used in the compositions of the present invention.

In addition to these thermosetting resins, the resin blend can optionally include a thermoplastic resin. The thermoplastic resin is preferably a polyester-polyurethane hybrid resin. Such resins are used to improve the flexibility, hot strength, and impact properties of the polymer concrete composites. They are soluble in unsaturated polyester resins, which will increase the low profile properties for both structural and low shrink compositions. Typically, at least about 0.5 weight percent and no more than about 3 weight percent, based on the total weight of the composition, of the thermoplastic resin (or mixture of such resins) is used in the compositions of the present invention.

The resin blend can also include one or more compatible unsaturated monomers for crosslinking. Examples of such comonomers include, for example: aromatic compounds such as styrene, alpha-methyl styrene, dichlorostyrene, vinyl naphthalene, vinyl phenol, and the like; unsaturated esters such as acrylic and methacrylic esters, vinyl laurate, and the like; unsaturated acids such as acrylic and alpha-alkylacrylic acids, butenoic acids, allylbenzoic acid, vinylbenzoic acid, and the like; halides such as vinyl chloride, vinylidene chloride, and the like; nitriles such as acrylonitrile, methacrylonitrile, and the like; diolefins such as butadiene, isoprene, methylpentadiene, and the like; esters of polycarboxylic acids such as diallyl phthalate, divinyl succinate, diallyl maleate, divinyl adipate, dichloroallyl tetrahydrophthalate, and the like; and mixtures thereof.

The polymer concrete compositions also include at least one catalyst. Suitable catalysts include conventional free radical polymerization initiators, such as organic peroxides, hydroperoxides, and azo compounds. Preferably, they are organic peroxides and hydroperoxides. More preferably, suitable catalysts are selected from the group consisting of benzoyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide, t-butyl peroctoate, and the like. Most preferably, the catalyst is methyl ethyl ketone peroxide. The catalyst should be able to promote a reaction and function in a temperature range of about 0° C. to about 60° C., and cause the reaction to exotherm to a temperature within a range of about 60° C. to about 1 15 C. A catalyst (or mixture of catalysts) are typically used in an amount of about 1–2 weight percent, based on the total weight of the resin blend.

The polymer concrete compositions also preferably include at least one promoter or accelerator to decrease the gel time and/or cure time. Suitable promoters include transition metal salts or complexes such as cobalt naphthanate; and organic bases such as N,N-dimethylaniline (DMA) and N,N-diethylaniline (DEA). Preferably, cobalt naphthanate and DMA are used in combination. Each is preferably used in an amount of about 0.05–3 weight percent, based on the total weight of the resin blend.

The polymer concrete compositions of the present invention can also include at least one coupling agent to provide improved adhesion of the resin blend to inorganic surfaces. Typically, the coupling agent increases composite wet and dry tensile strength and modulus, flexural strength and modulus, as well as wet and dry compressive strength. It can also improve the formulation filler wet-out, dispersion, and processability of the materials. Preferably, the coupling agent is a silane coupling agent. Suitable silane coupling agents include amine-functional or epoxy-functional silanes. Examples of silane coupling agents include, but are not limited to, N-(2-aminoethyl)-3-aminopropyl treimethoxysilane, N-(2-aminoethyl)-3-aminopropyl methyldimethoxysilane, (aminoethylaminomethyl)-phenylethyl trimethoxysilane, 4-aminobutyl dimethylmethoxysilane, glycidoxypropyl trimethoxysilane, bis(3-glycidoxypropyl) tetramethyldisiloxane, 3-glycidoxypropyl dimethylethoxysilane, and 3-glycidoxypropyl methyldiethoxysilane. The silane is preferably used in an amount of about 0.1–1 weight percent, based on the total weight of the resin blend.

The polymer concrete compositions of the present invention include a mixture of fillers and reinforcement materials. Examples of suitable fillers and reinforcement materials include, but are not limited to, shredded bamboo, antimony trioxide, alumina trihydrate, milled fiberglass, chopped fiberglass, silica (amorphous, fumed, or crystalline), calcium carbonate, perlite, glass microspheres, talc, zinc stearate, baryte (barium sulfate), ceramic microspheres, carbon (e.g., graphite), boron carbide, silicon carbide, graphite, aluminum oxide, crystalline silica, titanium dioxide, frac, polymica, muscovite mica, mica spheres, coke flour, and kesin, to name a few dry materials. Preferably, the polymer concrete compositions of the present invention include mixtures of such materials.

Preferred compositions include at least about 10 weight percent, based on the total weight of the composition, of a filler (or mixture of fillers) having an average particle size of less than about 500 microns. Typically, no more than about 40 weight percent, based on the total weight of the composition, of such extremely fine filler (or mixture of extremely fine fillers) is used in the compositions of the present invention. Material having an average particle size of about 20–500 microns is particularly preferred. As used herein, particle size refers to the longest dimension (e.g., diameter) of a particle.

Such extremely fine particle size fillers include crystalline silica, amorphous silica, baryte (barium sulfate), mica, glass or ceramic microspheres. These materials are primarily used to reduce the weight of the material and increase filler loading and/or packing of the dry materials. They enhance the flow characteristics, reduce shrinkage and water absorption, and improve chemical resistance of the final polymer concrete. They also provide leach-free composites with pores that are not connected. Baryte is particularly preferred because the baryte does not absorb the resin and has a low oil absorption rate, so that it remains generally unreactive in the composition. Also, the baryte prevents contact between any silica particles present, thereby avoiding the formation of leach paths for any solutions, and achieving a non-connected pore structure with larger filler materials. Significantly, the baryte and ceramic microspheres increase the bond strength between previously cured polymer concrete parts and between coating or repair polymer concrete and a previously cured part.

Preferred compositions also include fine and coarse fillers. Herein, fine fillers are those having an average particle size of about 500–1000 microns. Such fine particle size fillers typically include crystalline silica. They are used for filler loading and compressive strength of the polymer concrete composites. Typically, at least about 20 weight percent and no more than about 60 weight percent, based on the total weight of the composition, of the fine filler (or mixture of fine fillers) is used in the compositions of the present invention. Herein, coarse fillers are those having an average particle size of greater than about 1000 microns, and preferably, greater than about 1500 microns and up to about 1 centimeter. Such coarse particle size fillers typically include crystalline silica. They are used for filler loading and compressive strength of the polymer concrete composites. Typically, at least about 15 weight percent and no more than about 60 weight percent, based on the total weight of the composition, of the coarse filler (or mixture of coarse fillers) is used in the compositions of the present invention.

Particularly preferred compositions also include fibers or fibrous fillers. Fibrous fillers are typically inorganic materials such as glass or ceramic. Although fibers of a variety of lengths can be used, they are typically less than about 1.5 centimeters in length. Average fiber diameters typically range from about 10–20 microns. Typically, at least about 0.15 weight percent and no more than about 5 weight percent, based on the total weight of the composition, of the fibrous filler (or mixture of fibrous fillers) is used in the compositions of the present invention.

The polymer concrete compositions can include other additives such as, for example, flex additives, inhibitors, defoaming agents, wetting agents, pigments, dyes, mold release agents, thixotropic agents, plasticizers, stabilizers, extenders, oils, tars, asphalts, suppressants, emission agents, penetrating agents, lock down agents, and the like. For example, in order to prevent air entrapment in the composition, a defoaming agent can be used (typically at a weight percentage of about 0.1 percent to about 0.15 percent, based on the resin blend weight).

Typically, in making polymer concrete, the liquids are blended with the dry filler materials. A sizing or binder of polyester, epoxy, or silane can be applied to some of the dry filler material surfaces prior to combining them with the liquids. More specifically, the liquids are all combined except any catalyst and then the extremely fine and fine filler materials are combined with these liquids. The catalyst is added next, the coarse filler material, and finally the fibrous material is added.

The formwork for making electrolytic containers consists of a steel assembly which will include an outside form, inside form, overflow blockout, end forms, turning pinions, a special overflow assembly plate form, and a top plate with vacuum capabilities. This set-up will allow for a single container casting. The finished casting will be hydraulically along with pneumatically pressed off the inside mold. The cast container will be placed in a special hydraulic lift and turning frame to allow for 180° rotation of the finished casting.

FIG. 1 shows a representative electrolytic container 10 made from a polymer concrete composite of the present invention. Container 10, which is a monolithic structure has an inlet 12, a drain 14, FRP rebar 16, and an overflow box and decant 18.

Advantages of the invention are illustrated by the following examples. However, the particular materials and amounts thereof recited in these examples, as well as other conditions and details, are to be interpreted to apply broadly in the art and should not be construed to unduly limit the invention.

EXAMPLES

Exemplary Formulations

The following table lists the weight percentages, based on the total weight of the composition, of the components of typical polymer concrete compositions of the present invention:

| Component | Example 1 | Example 2 | Example 3 |
| --- | --- | --- | --- |
| Vinyl ester resin | 9.46% | 9.30% | 10.65% |
| Isophthalic polyester resin | 1.14% | 1.13% | 1.29% |
| Polyester-polyurethane hybrid resin | 0.86% | 0.85% | 0.97% |

-continued

| Component | Example 1 | Example 2 | Example 3 |
|---|---|---|---|
| N,N-dimethylaniline | 0.02% | 0.02% | 0.02% |
| 6% Cobalt naphthenate | 0.03% | 0.03% | 0.03% |
| MEKP | 0.14% | 0.13% | 0.15% |
| #20 silica | 25.44% | 21.07% | 59.58% |
| #30 silica | — | 4.21% | 13.90% |
| 0.32 cm silica | 27.65% | 21.07% | — |
| 0.95 cm silica | 21.02% | 27.40% | — |
| "FILLITE" ceramic microspheres | 0.54% | 0.54% | 11.92% |
| Baryte (barium sulfate) | 12.7% | 12.86% | 0.50% |
| 0.08 cm milled fiberglass | 6.33% | 0.76% | 0.70% |
| 0.64 cm chopped fiberglass | 0.32% | 0.32% | 0.29% |
| Titanium dioxide | 0.32% | 0.32% | — |
| Carbon black | 0.01% | 0.01% | — |

The following is a more detailed break down of each preferred component of the polymer concrete compositions listed above.

The vinyl ester resin is a low viscosity (450 Cps), unpromoted vinyl ester resin containing styrene available under the trade designation "HETRON" 922 from Ashland Chemical, Inc., Columbus, Ohio. It is the base resin in the formulation and exhibits excellent corrosion resistant properties to strong acids and bases, along with high impact strength and high tensile elongation. It is also resistant to both impact and thermal shock damage. Other vinyl ester resins can be used, including Ashland's "HETRON" 922-L resin, Dow Chemical's "DERAKANE" 411 and 411-PC, 470 and 510-series resins, Reichold's "DION" 9100 and 9300 series resins, as well as Reichold's "ATLAC" 580 series resins.

Additional resins can be blended with the vinyl ester to increase the overall strength properties of the resin system. The isophthalic polyester and polyester-polyurethane resins are added to increase the toughness, tensile strength, and impact strength of the polymer concrete composite. The isophthalic polyester resin typically reduces shrinkage and the polyester-polyurethane hybrid resin typically improves flexibility. Isophthalic polyester resins are available from Ashland under the trade designation "AROPOL" and Reichold under the trade designations "ATLAC" and "DION" 6000 series. Polyester-polyurethane resins are available from Reichold under the trade designation "POLYLITE" 30,000 series and the Ashland/ECT "Q" series.

Two promoters are used in the compositions listed above—cobalt naphthenate and N,N-dimethylaniline (DMA). The cobalt naphthenate used was a 6% Cobalt Nap-All. It is available from Huls America and Mooney Chemical, for example. It is added to the composition to decrease the time required for the compoition to gel. The DMA is added to the composition to decrease the time required for the composition to cure. DMA is commercially available from a variety of sources including Aldrich Chemical Co. To convert the material to a solid thermoset structure, methyl ethyl ketone peroxide (MEKP), which is available from a variety of sources including Witco Chemical Co., Atochem N. America, and Reichhold, is the catalyst.

The compositions also include extremely fine fillers. These include baryte (barium sulfate), which is available from Mountain Minerals Co., Ltd., Lethbridge, Alberta, Canada. This material has a particle size of about 1–11 microns, depending on the grade. Another extremely fine filler is a ceramic material in the form of microspheres, which is available under the trade designation "FILLITE" 300 LF from Fillite (division of Boliden Intertrade Inc.), Atlanta, Ga. This material has a particle size of about 5–300 microns.

The other dry filler materials included within the compositions listed above are a variety of fine and coarse silicas, silicon dioxides, and crystalline silica quartz, which are typically characterized by grades/mesh sizes. The typical physical analysis of the fine silica is as follows (percent retained/screem size): trace/#30; 30–35%/#40; 48–54%/#50; 10–14%/#70; 4–6%/#100 screen. This material is available from Wedron Silica, Wedron, Ill., as foundry grade silica (grade 430). The typical physical analysis of the coarse silica is as follows (percent retained/screem size): 1–4%/#20; 88–96%/#30; 6–10%/#40; 1–4%/#50 screen. This material is available from Wedron Silica, Wedron, Ill., as foundry grade silica (grade 390).

The fiber reinforcement is used to increase the impact strength, modulus, and overall mechanical properties of the polymer concrete composites of the present invention. The use of random reinforcement milled and chopped glass also helps the "green strength" of the cast part, so that the part may be removed from the mold before it is completely cured. Fiberglass reinforcement is available from a variety of sources including Owens-Corning Fiberglass Corp. and PPG Industries.

The resulting homogeneous compositions exhibited superior strength characteristics such as high impact resistant, high tensile-elongation, high compressive strength, high flexural strength, and high shear strength. They displayed excellent electrical insulation, high bonding or thermal compatibility, and low shrinkage. Also, they displayed a great degree of toughness and resilience to a wide variety of aggressive corrosive environments and corrosive chemical solutions.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A castable polymer concrete composition preparable by combining components comprising:
    (a) a resin blend comprising at least one unsaturated vinyl ester resin at least one unsaturated polyester resin, and at least one liquid thermoplastic resin;
    (b) at least about 10 weight percent, based on the total weight of the composition, of extremely fine filler material having an average particle size of less than about 500 microns; and
    (c) at least about 20 weight percent, based on the total weight of the composition, of fine filler material having an average particle size of about 500–1000 microns.

2. The composition of claim 1 further comprising at least about 15 weight percent, based on the total weight of the composition, of coarse filler having an average particle size of greater than about 1000 microns.

3. The composition of claim 1 wherein the thermoplastic resin is a thermoplastic polyester-polyurethane resin.

4. The composition of claim 1 wherein the unsaturated vinyl ester resin is a modified styrenated epoxy vinyl ester resin.

5. The composition of claim 1 wherein the unsaturated polyester resin is an isophthalic or orthophthalic polyester resin.

6. The composition of claim 5 wherein the unsaturated polyester resin is an isophthalic polyester resin.

7. The composition of claim 1 wherein the extremely fine filler is present in an amount of about 10–40 weight percent, based on the total weight of the composition.

8. The composition of claim 1 wherein the extremely fine filler comprises baryte.

9. The composition of claim 8 wherein the extremely fine filler further comprises ceramic microspheres.

10. A castable polymer concrete composition preparable by combining components comprising:
 (a) a resin blend comprising at least one thermoset styrenated epoxy vinyl ester resin, at least one thermoset isophthalic or orthophthalic polyester resin, and at least one liquid thermoplastic polyester-polyurethane resin;
 (b) about 10–40 weight percent, based on the total weight of the composition, of extremely fine filler material having an average particle size of less than about 500 microns; and
 (c) about 20–60 weight percent, based on the total weight of the composition, of fine filler material having an average particle size of about 500–1000 microns.

11. The composition of claim 10 wherein the extremely fine filler comprises baryte.

12. The composition of claim 10 comprising filler materials and resin blend in a weight ratio of at least about 4:1.

13. The composition of claim 10 further comprising fibrous filler material.

14. A castable polymer concrete composition preparable by combining components comprising:
 (a) a resin blend comprising at least one unsaturated vinyl ester resin, at least one unsaturated polyester resin, and at least one liquid thermoplastic resin; and
 (b) at least about 10 weight percent, based on the total weight of the composition, of baryte.

15. A polymer concrete composite preparable by a method comprising:
 (a) combining components comprising:
  (i) a resin blend comprising at least one unsaturated vinyl ester resin, at least one unsaturated polyester resin, and at least one liquid thermoplastic resin;
  (ii) at least about 10 weight percent, based on the total weight of the composition, of extremely fine filler material having an average particle size of less than about 500 microns; and
  (iii) at least about 20 weight percent, based on the total weight of the composition, of fine filler material having an average particle size of about 500–1000 microns; and
 (b) curing said combination of components.

16. A cast article preparable by a method comprising:
 (a) combining components comprising:
  (i) a resin blend comprising at least one unsaturated vinyl ester resin, at least one unsaturated polyester resin, and at least one liquid thermoplastic resin;
  (ii) at least about 10 weight percent, based on the total weight of the composition, of extremely fine filler material having an average particle size of less than about 500 microns; and
  (iii) at least about 20 weight percent, based on the total weight of the composition, of fine filler material having an average particle size of about 500–1000 microns;
 (b) placing said combination of components in a mold; and
 (c) curing said combination of components.

17. The cast article of claim 16 which is a monolithic cast structure.

18. The cast article of claim 17 which is an electrolytic container.

19. A method of making a polymer concrete composite, the method comprising:
 (a) preparing a resin blend comprising at least one unsaturated vinyl ester resin, at least one unsaturated polyester resin, and at least one liquid thermoplastic resin;
 (b) adding to the resin blend at least about 10 weight percent, based on the total weight of the composition, of extremely fine filler material having an average particle size of less than about 500 microns and at least about 20 weight percent, based on the total weight of the composition, of fine filler material having an average particle size of about 500–1000 microns;
 (c) adding a catalyst to the mixture of extremely fine and fine filler materials and resin blend;
 (d) adding to the mixture of extremely fine and fine filler materials and resin blend, at least about 15 weight percent, based on the total weight of the composition, of coarse filler having an average particle size of greater than about 1000 microns; and
 (e) adding fibrous filler material to the mixture of extremely fine, fine, and coarse filler materials and resin blend.

20. A castable polymer concrete composition preparable by combining components comprising:
 (a) a resin blend comprising at least two thermoset resins and at least one liquid thermoplastic resin;
 (b) at least about 10 weight percent, based on the total weight of the composition, of extremely fine filler material having an average particle size of less than about 500 microns;
 (c) at least about 20 weight percent, based on the total weight of the composition, of fine filler material having an average particle size of about 500–1000 microns; and
 (d) fibrous filler material.

21. The composition of claim 20 further comprising at least about 15 weight percent, based on the total weight of the composition, of coarse filler having an average particle size of greater than about 1000 microns.

22. The composition of claim 20 wherein the thermoplastic resin is a thermoplastic polyester-polyurethane resin.

23. The composition of claim 20 wherein the thermoset resin is a flexible unsaturated polyester resin.

24. The composition of claim 23 wherein the unsaturated polyester resin is an isophthalic polyester resin.

25. The composition of claim 23 wherein the extremely fine filler comprises baryte.

26. A castable polymer concrete composition preparable by combining components comprising a resin blend comprising at least two thermoset resins and at least one liquid thermoplastic resin.

27. The composition of claim 26 further comprising baryte.

28. A polymer concrete composite preparable by a method comprising:
 (a) combining components comprising:
  (i) a resin blend comprising at least two thermoset resins and at least one liquid thermoplastic resin;
  (ii) at least about 10 weight percent, based on the total weight of the composition, of extremely fine filler material having an average particle size of less than about 500 microns; and (iii) at least about 20 weight percent, based on the total weight of the composition, of fine filler material having an average particle size of about 500–1000 microns; and (b) curing said combination of components.

29. A cast article preparable by a method comprising:

(a) combining components comprising:
- (i) a resin blend comprising at least two thermoset resins and at least one liquid thermoplastic resin;
- (ii) at least about 10 weight percent, based on the total weight of the composition, of extremely fine filler material having an average particle size of less than about 500 microns; and
- (iii) at least about 20 weight percent, based on the total weight of the composition, of fine filler material having an average particle size of about 500–1000 microns;

(b) placing said combination of components in a mold; and (c) curing said combination of components.

30. A method of making a polymer concrete composite, the method comprising:

(a) preparing a resin blend comprising at least two thermoset resins and at least one liquid thermoplastic resin;

(b) adding to the resin blend at least about 10 weight percent, based on the total weight of the composition, of extremely fine filler material having an average particle size of less than about 500 microns and at least about 20 weight percent, based on the total weight of the composition, of fine filler material having an average particle size of about 500–1000 microns;

(c) adding a catalyst to the mixture of extremely fine and fine filler materials and resin blend;

(d) adding to the mixture of extremely fine and fine filler materials and resin blend, at least about 15 weight percent, based on the total weight of the composition, of coarse filler having an average particle size of greater than about 1000 microns; and (e) adding fibrous filler material to the mixture of extremely fine, fine, and coarse filler materials and resin blend.

* * * * *